(12) United States Patent
Batross

(10) Patent No.: US 11,770,299 B2
(45) Date of Patent: Sep. 26, 2023

(54) SYSTEMS AND METHODS FOR PREPROCESSING AUTOMATED NETWORK DEVICE CONFIGURATION GENERATION TEMPLATES

(71) Applicant: HEWLETT PACKARD ENTERPRISE DEVELOPMENT LP, Houston, TX (US)

(72) Inventor: Kyle Batross, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/234,156

(22) Filed: Apr. 19, 2021

(65) Prior Publication Data

US 2022/0278897 A1  Sep. 1, 2022

Related U.S. Application Data

(60) Provisional application No. 63/154,517, filed on Feb. 26, 2021.

(51) Int. Cl.
*H04L 41/084* (2022.01)
*H04L 41/08* (2022.01)
*H04L 41/0816* (2022.01)

(52) U.S. Cl.
CPC ...... *H04L 41/0843* (2013.01); *H04L 41/0816* (2013.01); *H04L 41/0886* (2013.01)

(58) Field of Classification Search
CPC ............. H04L 41/0843; H04L 41/0816; H04L 41/0886
See application file for complete search history.

(56) References Cited

U.S. PATENT DOCUMENTS

| 5,760,775 A | * | 6/1998 | Sklut | G06F 3/1204 399/81 |
| 6,336,138 B1 | * | 1/2002 | Caswell | H04L 41/12 345/440 |
| 6,560,604 B1 | * | 5/2003 | Fascenda | G06F 9/44505 707/999.01 |
| 7,054,924 B1 | * | 5/2006 | Harvey | H04L 67/303 709/203 |
| 7,457,853 B1 | | 11/2008 | Chari et al. | |

(Continued)

FOREIGN PATENT DOCUMENTS

| CA | 2719099 A1 | * | 9/2009 | ......... H04L 12/2807 |
| CN | 109361550 A | * | 2/2019 | ......... H04L 41/0266 |
| CN | 112887268 B | * | 7/2022 | ........... G06K 9/6218 |

OTHER PUBLICATIONS

Cisco, "Cisco SD-WAN: Support Product Documentation," website retrieved Dec. 14, 2020, 9 pgs., https://sdwan-docs.cisco.com/Product_Documentation/vManage_Help/Release_16.3/Configuration/Templates.

*Primary Examiner* — Patrice L Winder
*Assistant Examiner* — Angela M Widhalm De Rodriguez
(74) *Attorney, Agent, or Firm* — Mauriel Kapouytian Woods LLP

(57) ABSTRACT

Systems and methods are provided for receiving a template usable to generate a configuration for at least one network device. A specification in a preprocess file can be interpreted to request at least one server-side feature to be used for the template. Data can be received from a server based on the interpreting the specification. The data can be provided to the template. The template can reference the data when generating the configuration.

19 Claims, 7 Drawing Sheets

(56) References Cited

U.S. PATENT DOCUMENTS

| | | | |
|---|---|---|---|
| 8,874,755 B1* | 10/2014 | Deklich | G06F 15/177 |
| | | | 709/226 |
| 9,202,025 B2 | 12/2015 | Marshall | |
| 9,426,030 B1* | 8/2016 | Anerousis | H04L 41/08 |
| 9,817,807 B1* | 11/2017 | Nagargadde | H04L 67/16 |
| 10,171,383 B2* | 1/2019 | Johnston | H04L 47/827 |
| 10,318,265 B1* | 6/2019 | To | H04L 67/34 |
| 10,331,321 B2 | 6/2019 | Milden et al. | |
| 10,700,931 B2 | 6/2020 | Sheshadri et al. | |
| 2005/0027835 A1* | 2/2005 | Raikar | H04L 41/0843 |
| | | | 709/222 |
| 2005/0038880 A1* | 2/2005 | Danforth | H04L 67/34 |
| | | | 709/222 |
| 2006/0050862 A1* | 3/2006 | Shen | H04Q 3/0062 |
| | | | 379/219 |
| 2006/0092861 A1* | 5/2006 | Corday | H04L 41/0246 |
| | | | 370/256 |
| 2009/0157852 A1* | 6/2009 | Krupkin | G06F 15/177 |
| | | | 709/220 |
| 2010/0094981 A1* | 4/2010 | Cordray | H04L 41/0806 |
| | | | 709/224 |
| 2011/0161798 A1* | 6/2011 | Bennett | G06F 16/86 |
| | | | 715/234 |
| 2011/0173302 A1* | 7/2011 | Rider | G06F 9/44505 |
| | | | 709/220 |
| 2012/0170571 A1* | 7/2012 | Antonelli | H04L 69/04 |
| | | | 370/352 |
| 2014/0156816 A1* | 6/2014 | Lopez Da Silva | H04L 41/0813 |
| | | | 709/221 |
| 2015/0006730 A1* | 1/2015 | Helfman | G06F 9/5072 |
| | | | 709/226 |
| 2015/0220327 A1* | 8/2015 | Poon | G06F 16/21 |
| | | | 717/120 |
| 2016/0104090 A1* | 4/2016 | Alekseyev | G06Q 10/06393 |
| | | | 705/7.39 |
| 2016/0255139 A1* | 9/2016 | Rathod | H04L 51/046 |
| | | | 709/203 |
| 2017/0126496 A1* | 5/2017 | Sikand | H04L 41/0813 |
| 2017/0187575 A1* | 6/2017 | Waugh | H04L 41/5009 |
| 2018/0034698 A1* | 2/2018 | Perez | H04L 41/0886 |
| 2018/0109421 A1* | 4/2018 | Laribi | H04L 41/0843 |
| 2019/0238403 A1* | 8/2019 | Wang | H04L 41/0806 |
| 2020/0112487 A1* | 4/2020 | Inamdar | H04L 67/14 |
| 2020/0218798 A1* | 7/2020 | Kosaka | G06F 9/455 |

* cited by examiner

```
#if ($device.getAttribute("routed_port"))    # Check if a network device has routing capabilities
Configure L3 Configs ie:
ip address 1.0.0.1/24
#else
Configure L2 Configs ie:
portfilter 1/1/1
#end
```

200

202 — first block (#if ... #else)
204 — second block (#else ... #end)

```
1  {
2      "includeData": "attributes"
3  }
```

```
1  {
2      "configSearch [
3      {
4        "type": "match"
5        templateVariableName": "vlan_results"
6        "regex": "vlan .",
7        "context": [ ]
8        "triggerOn": {
9          "data_input": "op"
10         "data_value": [
11           "delete",
12           "add"
13         ]
14         "type": "global"
15       }
16     }
17    ]
18 }
```

FIG. 5B

SYSTEMS AND METHODS FOR PREPROCESSING AUTOMATED NETWORK DEVICE CONFIGURATION GENERATION TEMPLATES

RELATED APPLICATIONS

This application claims the benefit of and priority to U.S. Provisional Patent Application No. 63/154,517, filed on Feb. 26, 2021, the contents of which is incorporated herein by reference in its entirety.

DESCRIPTION OF RELATED ART

Recent advancements regarding Internet of Things (IoT), content streaming, cloud computing, and the like have substantially changed how people go about in their daily lives. It is undeniable that access to networks has never been more important. The networks are supported by various types of network devices that perform their respective roles. One challenge in today's networks relates to managing hundreds or thousands of network devices such that the network devices can fully utilize their offerings of various capabilities.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is an example pseudo code of a template that can render network device configurations, according to embodiments of the present disclosure.

FIGS. 5A-5B are example specifications of preprocess files, according to embodiments of the present disclosure.

Figure 1:
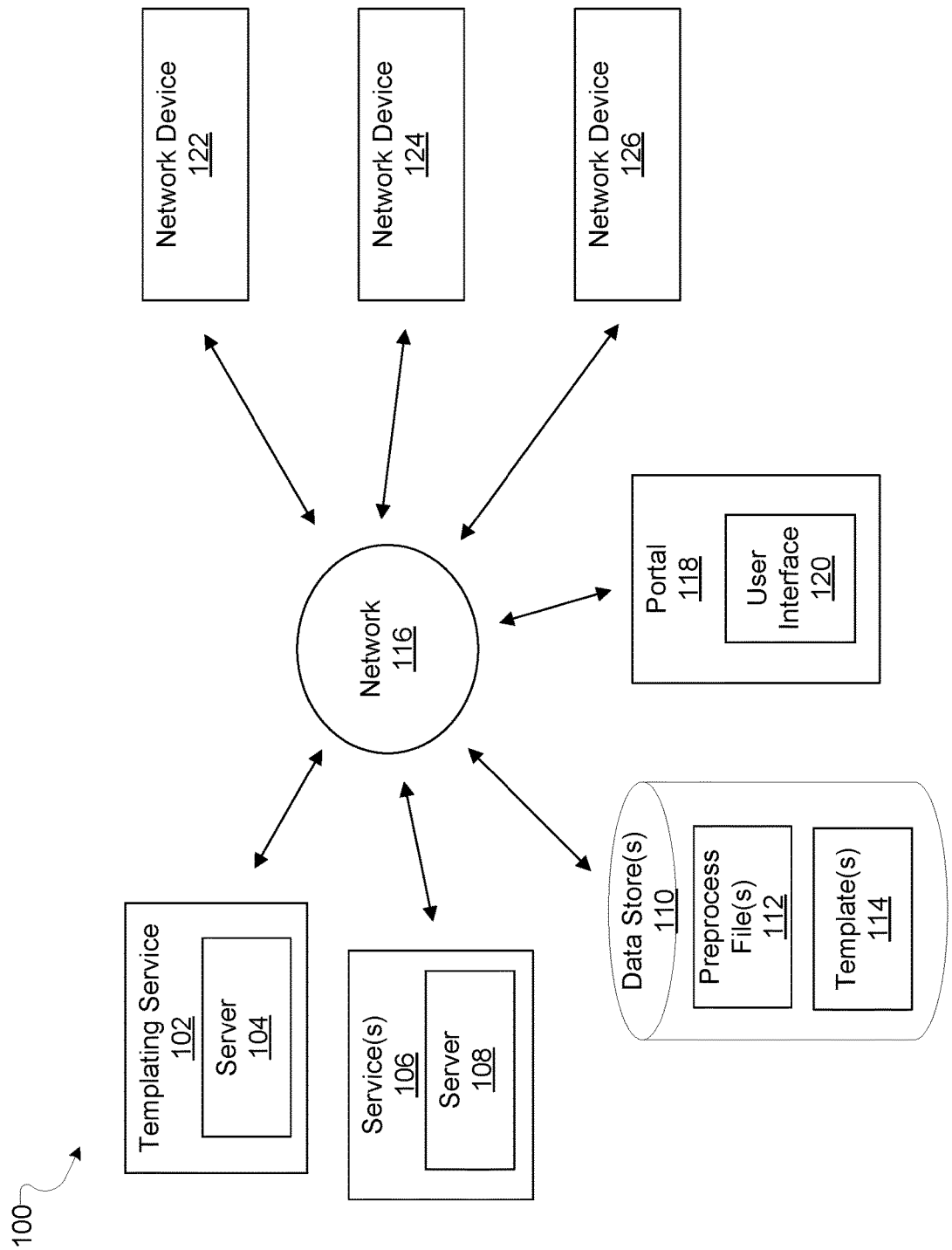
FIG. 1 is a block diagram of an exemplary network environment, according to embodiments of the present disclosure.

The figures are not exhaustive and do not limit the present disclosure to the precise form disclosed.

DETAILED DESCRIPTION

Different network devices support different capabilities that may require different configurations. Additionally, network devices in different deployment environments may require different configurations that are catered to the deployment environments. As increasing number of network devices are deployed each day with different capabilities, configuring the network devices with minimal effort has become an important concern for network administrators. Conventional approaches in configuring network devices utilize "templates." A template can contain a script (e.g., code) that can render configuration lines that are executed on network devices to configure the network devices. The "rendering" of a template can be considered as generating specific configuration lines that are to be executed on a network device based on the script and input data. The template can use various logic (e.g., conditional logic, looping logic, etc.) in the script of the template and the input data to specify values in the script and generate the specific configuration lines for a particular network device. An example template is described with more details in FIG. 2. Rendered configuration lines are provided to one or more network devices to create, update, delete, or perform other operations for one or more properties of a network device. The configuration lines can be executed automatically or manually. The network device can enable, modify, or disable any number of capabilities of the network devices based on the properties.

The conventional approaches face significant challenges in function and scalability. If a template is to account for all different types, models, and capabilities of network devices, a script in the template must contain hundreds or thousands of lines. Managing such a template can quickly become too cumbersome for its size and readability. One solution to this problem is to provide multiple templates that each account for a particular property (e.g., network device capability) of network devices. However, this solution is not ideal in a sense that a number of templates can quickly become too large to be managed effectively. In either case, an introduction of a new network device variability (e.g., new capability) demands regular examinations and updates to the template(s). Thus, the template(s) can easily grow out of control under the conventional approaches.

Additionally, under conventional approaches, templates do not adequately provide for accessing external information. External information can be considered as information not included in a script of a template and available only from an outside source, such as via user input, a server, or a network device itself. For example, a user may provide input relating to enabling a network time protocol (NTP) server on a network device. The template cannot access external information relating to whether there already exists another network device that is currently operating as a NTP server on a network. Accordingly, conventional approaches can cause multiple network devices to operate as NTP servers, which may be an undesirable configuration. If the template could access the external information, then the undesirable configuration could have been avoided. Further, the network device may not support an NTP feature. Without external information, the template cannot determine for which network device it is rendering configuration lines. Under the conventional approaches, the template cannot adequately access external information that the network device to be configured supports the feature and relies on user input. Providing correct attributes to the templates hundreds of different network devices to be configured can be impractical. Accordingly, conventional approaches are very much limited in their usefulness and practicality. Shortcomings and drawbacks of the conventional approaches are discussed in greater detail with respect to FIG. 3.

The approach discussed herein is rooted in computer technology and overcomes the foregoing and other disadvantages associated with conventional approaches specifically arising in the realm of computer technology. Based on computer technology, the present technology provides methods and systems to account for network device variability in an optimized manner. The present technology provides preprocessing techniques that can provide external information as additional input data to templates. The preprocessing techniques can provide a preprocess file that can specify (e.g., define) which features or attributes to provide to a template. More details describing the present technology are provided below.

FIG. 1 is a block diagram 100 of an exemplary network environment, according to embodiments of the present disclosure. In some embodiments, some parts of the exemplary network environment can be in a cloud environment where each node of a cluster of nodes in the cloud environment provides one or more functions (e.g., the templating service 102, other services 106, a portal 116) of the exemplary network environment.

The block diagram 100 illustrates a templating service 102 and other services 106. As used herein, a service (e.g., a microservice), including the templating service 102 and the one or more services 106, can refer to a modular service architected to operate independently. Each service can have a specific purpose, and use a well-defined interface to communicate with other services or applications. That is, services typically follow a service-oriented architecture, where services are used to make up a broader application, the services being a loosely coupled collection of more fine-grained services, and using lightweight protocols. Services tend to be small in size, messaging-enabled, bounded by contexts/purpose-specific, autonomously developed, and independently deployable, decentralized, or built/released with automated processes.

In some embodiments, services 102, 106 can be provided on a single server (not shown). In some embodiments, each of the services 102, 106 can be provided on (e.g., executed on) a corresponding server 104, 108. The servers 104, 108 can be virtual machines or containers (e.g., Kubernetes containers).

Services 102, 106 can provide functionalities related to management of network devices 122, 124, 126 over a network 116. The network 116 may be a wired network, wireless network, or a combination of both. As an example functionality, the templating service 102 can render configuration lines for the network devices 122, 124, 126. As another example functionality, other services 106 can determine network device attributes, a list of network devices that have certain capability (e.g., NTP, virtual routing and forwarding (VRF), layer 3 routing), or the like. The other services 106 can communicate with the templating service 102 to provide information requested by the templating service 102. For instance, the other services 106 can provide attributes of a network device, a list of network devices supporting certain capabilities, or the like to the templating service 102.

The templating service 102 can provide its service based on at least one process file 112 and at least one template 114. The preprocess file 112 and/or template 114 can be stored and maintained on a data store 110. The data store 110 can be maintained on a server or can be a part of an external database/server that lies within the same cluster in a cloud as shown. The templating service 102 can acquire and/or cache the preprocess file 112 and the template 114 as needed in performing its service, such as when the templating service 102 receives a request for generating configurations.

The preprocess file 112 and/or the template 114 can be written by an entity managing the servers 104, 108 or by network administrators of customer sites. The preprocess file 112 can specify which external information to request from the server 102 and to provide to (e.g., inject into) the template 114. The preprocess file 112 can specify server-side functions or other services 106 that can provide such external information. The server-side functions can be considered as functions provided by the server 102 to execute any logic and/or obtain any network device information for network device(s) 122, 124, 126. For example, a server-side function can validate inputs passed to the preprocess file 112 and/or the template 114. As another example, a server-side function can obtain existing or current network device configuration(s) or information thereof (e.g., attributes including, model, type, capabilities, or the like that are associated with the network devices 122, 124, 126). Thus, the preprocess file 112 can enable the templating service 102 to execute and/or use any type of logic made available through the server-side functions to provide data to the template 114. In other words, in addition to aforementioned input data received from a user, the templating service 102 can additionally provide external information specified in the preprocess file 112 to the templating service 102. In some embodiments, the preprocess file 112 can specify external information via designations of which attributes to request. In some other embodiments, the preprocess file 112 can specify how to generate external information. More details describing the preprocess file 112 are provided with regard to FIGS. 5A-5B.

The preprocess file 112 can be a specification that can cause a service (e.g., the templating service 102 or the other service(s) 106 of FIG. 1) to provide external information to the template 114. The specification can be a set of rules or a set of simplified directions that instruct the templating service 102 to execute server-side functions. Further, the specification can enable authors of the preprocess file 112 to readily examine which features, logic, and/or data are needed for the template 114. For example, the service can interpret/preprocess the specification in the preprocess file 112 and request, acquire, and/or provide the external information (e.g., data) to the template 114. The external information can be network device configuration(s), network device attributes, result of feature/logic executed or fetched based on the directions of the preprocess file 112. The external information can be provided in a form consistent with an agreed upon data-interchange format. An example format can be a JavaScript Object Notation (JSON) format. The consistent format can facilitate communication of the external information between, among, or within the services 102, 106.

The templating service 102 can acquire external information after preprocessing of the preprocess file 112 and inject (e.g., provide or otherwise make available) the acquired external information into the template 114. Then, the templating service 102 can execute a script of the template 114 with the external information and render configuration lines.

In some embodiments, the portal 118 can be a front-end of the server 102. The portal 118 can provide a user interface 120 with which a user can provide input data. The block diagram 100 illustrates the portal 118 as a component connected over the network 116 with the server 102. In some embodiments, the portal 118 can be implemented as part of the server 102. The templating service 102 can receive input data via the user interface 120 of the portal 118 and provide the received input data to the preprocess file 112 and/or the template 114.

The network devices 122, 124, 126 can receive rendered configurate lines from the server 102. The rendered configuration lines can be executed on the network devices 122, 124, 126 to configure the network devices.

FIG. 2 is an example pseudo code 200 (e.g., a script) of a template that can render network device configurations, according to embodiments of the present disclosure. The example pseudo code 200 can receive an attribute "routed_port" that reflects whether a network device to be configured has routing capabilities. The attribute can be provided to the example pseudo code 200 as input data provided by a user or as external information provided by a service (e.g., the other services 106) running on a server (e.g., the server 108). In some embodiments, a templating service (e.g., the templating service 102) can acquire the external information via one or more services (e.g., the other services 106).

The example pseudo code 200 has conditional logic that is based on the input data. If a network device for which the template renders configuration lines supports the routing capabilities, executing the template can render configuration lines based on the first portion 202 but not the second portion 204. On the other hand, if the network device does not support the routing capabilities, executing the template can render the second portion 204 but not the first portion 202. Accordingly, the example pseudo code 200 of the template can render two different sets of configuration lines based on the input data.

Figure 3:
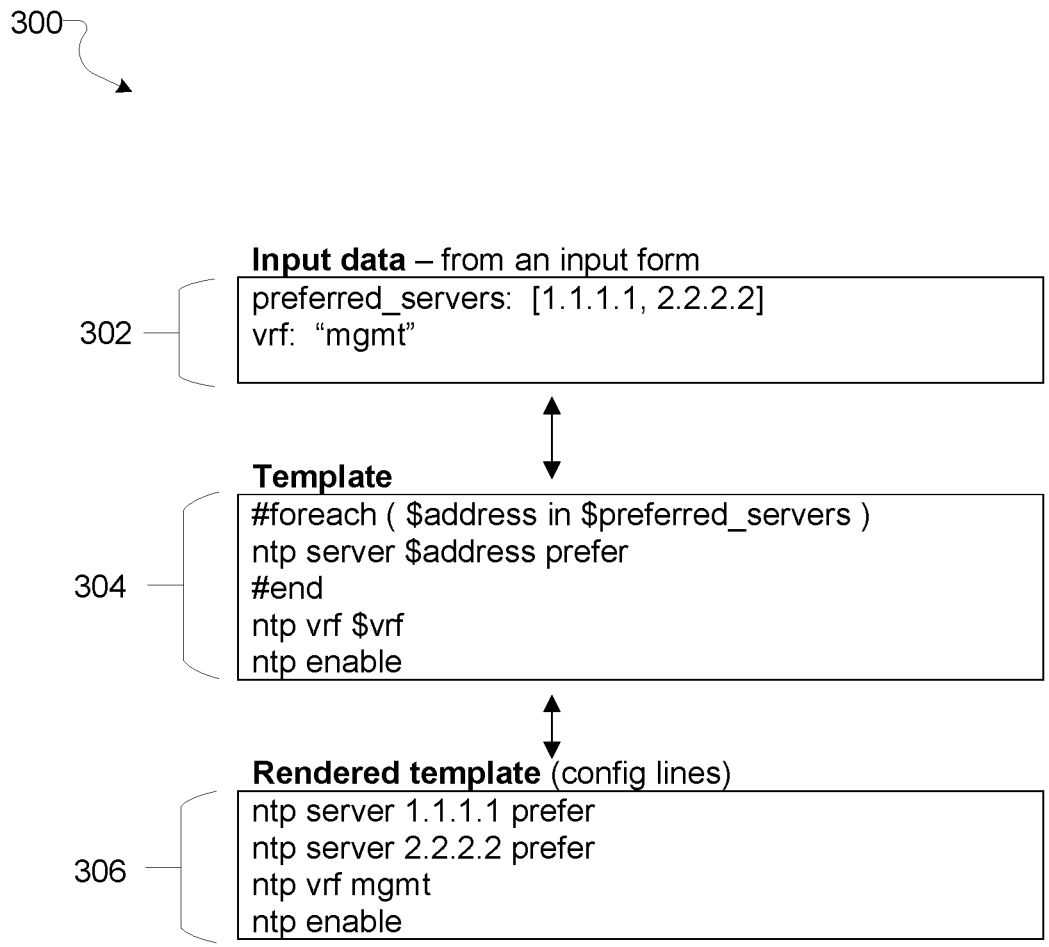
FIG. 3 illustrates an example conventional templating process.

FIG. 3 illustrates an example conventional templating process 300. The conventional templating process can involve acquiring input data, injecting the received input data into a template, and rendering configuration lines with a script of the template using the input data. Input data 302 can be provided by a user, such as a network administrator. The input data 302 can specify external information (e.g., information not available from within the template 304) to provide to a template 304.

In the example conventional templating process 300, the input data 302 specifies values with which to substitute variables "$preferred_servers" and "$vrf" in a script of the template 304. The template 304 can receive the values and, then, substitute corresponding variables in its script with the received values. As described, a script can contain various logic. The script of the template 304 contains a loop that is to render a configuration line for each value in "$preferred_servers". The script of the template 304 can render additional lines after the loop based on the input data 302. In a sense, the conventional templating process 300 can render an instance 306 of the template 304 that includes specific configuration lines to be executed on a network device. The specific configuration lines can be inserted into a network device configuration.

As illustrated and described, the conventional templating process 300 is limited to rendering configuration lines based off of input data 302 given to a template 304. This approach limits how useful a template 304 can be. This is due, at least in part, to the fact that templates have limited access to external information. In the conventional templating process 300, templates are not aware of what device it is configuring at runtime. Thus, the templates required all possible permutations of information needed and supported (e.g., operating system, type, model, capabilities). Requiring users to specify each and every external information can be impractical and inefficient. On the other hand, programmatically injecting all external information can add undesirable overhead. As a result, conventional templating process 300 utilizes templates to at best account for only a small set (e.g., handful) of variables. However, limiting each template to the small set of variables requires each template to conform to assumptions and limitations on where the template can be applied. Managing a catalogue of templates based on such assumptions and limitations can also be impractical and/or inefficient and, thus, undesirable. Nevertheless, the conventional templating process 300 does not provide the ability to granularly define exactly what is needed for a template.

Figure 4:
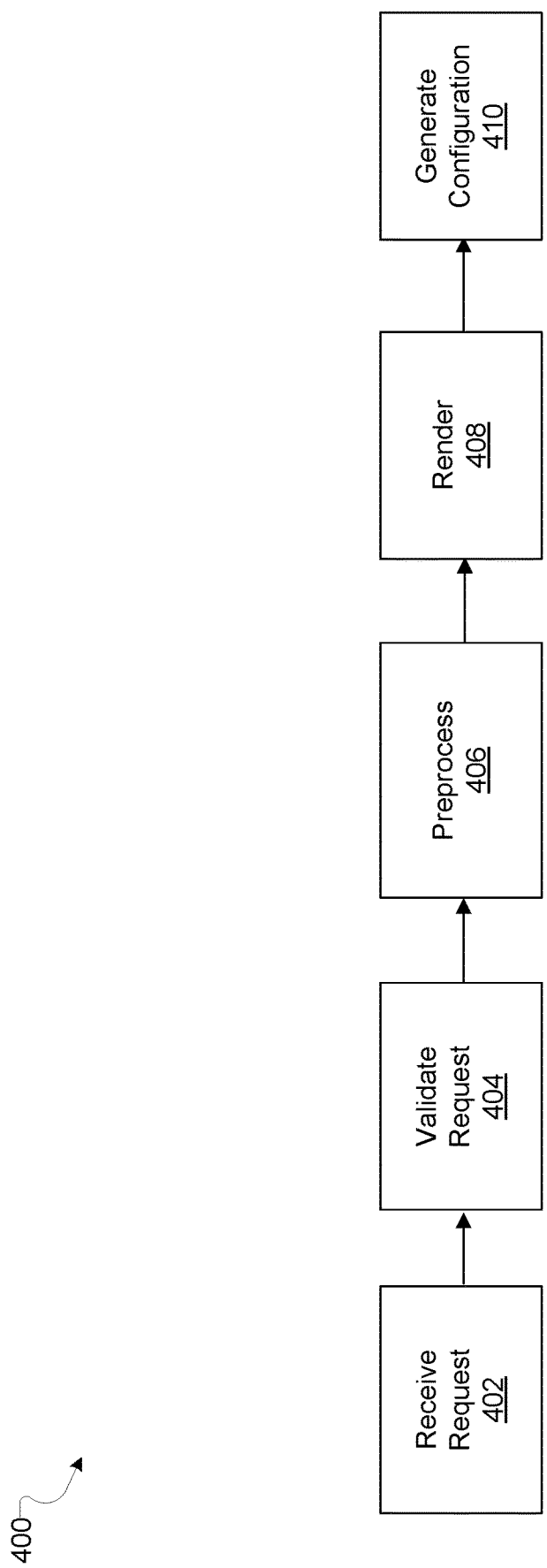
FIG. 4 is a flowchart of an improved templating process, according to embodiments of the present disclosure.

FIG. 4 is a flowchart 400 of an improved templating process, according to embodiments of the present disclosure. The improved templating process can include various stages including receiving a request 402 to generate a network device configuration, validating 404 the received request, preprocessing 406 at least one preprocess file, rendering 408 a template, and generating 410 the network device configuration. The improved templating process can optimize and otherwise improve upon a conventional templating process (e.g., the conventional templating process 300 of FIG. 3) by enabling a template to account for network device variability as well as providing flexible and simplified access to external information.

At the receiving request stage 402, a request to configure a network device can be received. The request can specify (1) a list of one or more network devices to configure and (2) at least one operation to update properties and/or configurations of the network devices. The operation can create new configurations (e.g., create a new virtual local area network (VLAN) configuration), update an existing configuration (e.g., update an existing interface), and/or delete an existing configuration (e.g., remove an NTP server configuration) for the list of network devices. The existing configuration can include a state of a network device and/or what capabilities the network device has (e.g., border gateway protocol (BGP) exist, access subnets are configured, or logging is enabled, or the like). In some embodiments, the request can include input data provided by a user via a portal (e.g., the portal 118 of FIG. 1). In some embodiments, the request can include input data programmatically provided via application programming interfaces (API). The request can specify the operation to be performed.

At the validating stage 404, the requested operations are checked for format and accuracy. For instance, where an internet protocol (IP) address value is provided in the request to update an IPv4 address of a network device, the value must conform to a format "#.#.#.#" and each "#" must be within a range of 0-255. An invalid value can be rejected and, in some instances, flagged for notification.

At the preprocessing stage 406—an additional stage of the improved templating process—features and attributes can be acquired and provided to a template (e.g., the template 114 of FIG. 1). The preprocessing stage 406 can involve a preprocess file (e.g., the preprocess file 112 of FIG. 1). The preprocess file can specify/define/convey what features and attributes are to be provided to the template.

A feature can be a capability or service (e.g., the service 106 of FIG. 1) provided from a server (e.g., the server 108 of FIG. 1) that enhances a template. An example feature can be a search feature that searches existing configurations for network devices that are managed by the server and provide a list of network devices that satisfy one or more criteria specified in the preprocess file. For instance, the preprocess file can specify a search for all network devices that are configured with VLAN and the improved templating process can perform the search, acquire results of the search, and provide the results to the template. An attribute can be a property value of a network device. To name a few, property values can include operating system, device type, model, maker identification, communication standard and protocol, supported features of a network device. More details describing features and attributes are provided with regard to FIGS. 5A-5B.

The preprocessing stage 406 can acquire feature results and attributes and convert or encapsulate the feature results and attributes in an agreed upon data-interchange format. An example format can be a format defined according to a JSON-schema. The feature results and attributes can be converted or encapsulated into JSON objects.

At the rendering stage 408, the template can be rendered based on input data and feature results and attributes in a similar manner to the conventional templating process 300 described with regard to FIG. 3. In the improved templating process, however, the rendering stage 408 has access to external information and can dynamically determine for which device configuration lines are to be generated. Additionally, the improved templating process enables the rendering stage 408 to leverage server-side features without containing server-side code. This enables authors of templates to add or remove features and functionalities from templates and/or optimize the templates without server-side changes.

At the generating stage 410, configuration lines can be generated based on the rendering of the template. The configuration lines can be executed on network devices to configure the network devices.

FIGS. 5A-5B are example specifications (e.g., code, descriptions, etc.) 500, 550 of preprocess files, according to embodiments of the present disclosure. The preprocess file can be validated for correctness of values and conformance to a defined schema, such as a JSON schema. The preprocess files can specify granularity of attributes to provide to a template (e.g., the template 114 of FIG. 1). In some instances, the granularity can specify breadth of attributes, ranging from one attribute to all attributes. In some instances, the granularity can specify depth of attributes, ranging from a top level attribute to lower level attributes. In some instances, the granularity can be a combination of both the breadth and depth. In the simple example specification 500, a preprocess file specifies, at line 2, acquisition of all attributes of network devices. All attributes may include operating system, device type, model, maker, capabilities, communication standard and protocol, or the like. In some other specifications, attributes can be specified with greater granularity, such as specifying acquisition of a maximum number of interfaces, supported routing capabilities, or the like. During preprocessing/interpreting of the preprocess files, a service (e.g., the templating service 102 or the other services 106 of FIG. 1) can request, acquire, and/or provide the attributes to a template (e.g., the template 114 of FIG. 1). Based on the provided attributes, the template can render configuration lines that are specific to the network devices.

Additionally, the preprocess file can specify one or more server-side features for generation of results to be provided to the template. The preprocess file enables granularized access to results and execution conditions of the server-side features. For example, the preprocess file can specify specific features, filter conditions to be applied to results of the features, how to provide the results, when to request the feature, or the like.

One example feature can be a search feature. In the more complex example specification 550, at line 2, a preprocess file specifies the search feature that provides a list of network device configurations. In some embodiments, a service (e.g., a service of the other services 106 of FIG. 1) can maintain the list of network device configurations and a templating service (e.g., the templating service 102 of FIG. 1) can receive the list of network device configurations from the service. The service can maintain the list of network device configurations and attributes of the network devices in a data structure, such as a tree data structure. The preprocess file can specify a context (e.g., a global/root context, a network device context, a VLAN context, or the like) in a hierarchy of the tree data structure to access and provide attributes in the specified context. At line 4, the preprocess file specifies conditions to filter search results to those results that match a regular expression specified at line 6. At line 5, the preprocess file specifies the filtered results to be stored in a specified variable, which can be used by a template to reference the filtered results. At lines 8-13, the preprocess file specifies when (e.g., trigger conditions) to request the feature. Lines 10-13 specifies that the search feature is to be performed only for deletion or addition requests. At line 14, the preprocess file specifies a global context for the search feature. Accordingly, the preprocess file can specify granularity with which to request the server-side features. Based on the search results, the template can render configuration lines that target specific configurations to update.

In some embodiments, results of executing a feature can be indexed. For example, the search feature can provide network device configurations that are indexed by each line, such as:

1: vlan 1
2: ntp server 1.1.1.1
3: ntp vrf mgmt
4: ntp enable

Line 1 contains a configuration line associated with VLAN. Lines 2-4 contain configuration lines associated with NTP. If the search feature specified granularity of VLAN, only line 1 can be provided to a templating service. If the search feature specified granularity of NTP, only lines 2-4 can be provided to the templating service. The line indices can indicate which configuration line(s) to modify or delete to the templating service. When no line indices are provided (e.g., search result is a null set), the templating service may generate a new configuration line to insert into a network device configuration.

A preprocess file can be iterated through for each specified external information. For example, if a preprocess file contains both of the example specifications 500, 550, the preprocess file can be iterated for the specified attributes of the example specification 500 and the feature results of the example specification 550. In each iteration, whether an optimization is requested can be examined. An optimization can relate to granularity of external information to acquire, filter conditions, trigger conditions, or the like.

If no optimization is requested, then broadest and top level of granularity is assumed (e.g., request of whole feature or all attributes are assumed as in the example specification 500). For instance, without further optimization, all external information relating to external information are acquired for every operation that specifies the external information without filters applied.

Alternatively, if optimization is requested, the optimization can be examined for any conditional logic and whether the conditional logic is satisfied. The conditional logic can include previously described matching criteria and/or trigger conditions. If the optimization (i) does not contain conditional logic or (ii) the conditional logic is satisfied, external information are acquired. The optimization can also be examined for any specified granularity of external information. In some embodiments, only external information satisfying the specified granularity can be acquired. In some embodiments, acquired external information can be filtered based on the specified granularity. Based off the iterations through the preprocess file, the specified external information and be made available to a template.

The use of preprocess files can provide numerous advantages. The preprocess files can encapsulate complexity of providing external information relating to network device variability (e.g., attributes) and network device configurations (e.g., feature results) to templates. The use of preprocess files can enable authors of templates to provide diverse external information to templates with few, if any, modifications to the templates. Additionally, the preprocess files provides templates with granular access of external information that can be simple (e.g., holistic) or detailed (e.g., selective). Further, the preprocess files can control when to provide external information, for example with event-trigger conditions, which can help a templating process avoid execution of costly operations when the operations are not needed. With the improved templating process, authors of templates can add or remove features and/or functionality from network devices without server-side changes.

Figure 6:
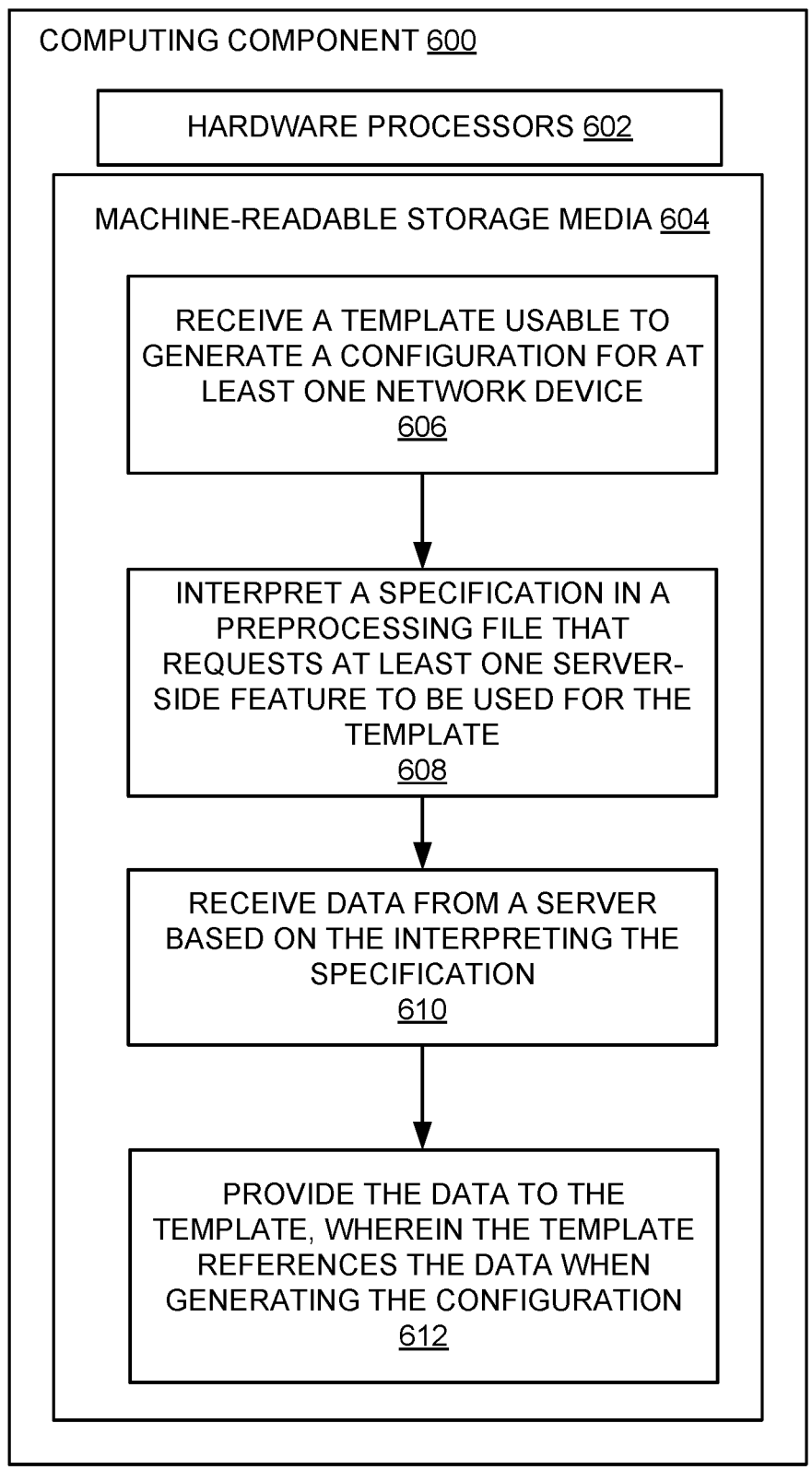
FIG. 6 depicts a set of executable instructions stored in machine-readable storage media that, when executed, cause one or more hardware processors to perform an illustrative method for providing seamless failover, according embodiments of the present disclosure.

FIG. 6 depicts a computing component 600 that includes one or more hardware processors 602 and machine-readable storage media 604 storing a set of machine-readable/machine-executable instructions that, when executed, cause the hardware processors 602 to perform an illustrative method for combining feature values according to example embodiments of the invention. The computing component 600 may be, for example, the computing system 700 depicted in FIG. 7 or another computing device described herein. The hardware processors 602 may include, for example, the processor(s) 704 depicted in FIG. 7 or any other processing unit described herein. The machine-readable storage media 604 may include the main memory 706, the read-only memory (ROM) 708, the storage 710, or any other suitable machine-readable storage media described herein.

At block 606, in example embodiments, instructions may be executed by the hardware processors 602 to receive a template usable to generate a configuration for at least one network device.

At block 608, in example embodiments, instructions may be executed by the hardware processors 602 to interpret a specification in a preprocess file that requests at least one server-side feature to be used for the template.

At block 610, in example embodiments, instructions may be executed by the hardware processors 602 to receive data from a server based on the interpreting the specification.

At block 612, in example embodiments, instructions may be executed by the hardware processors 602 to provide the data to the template. The template can reference the data when generating the configuration.

Figure 7:
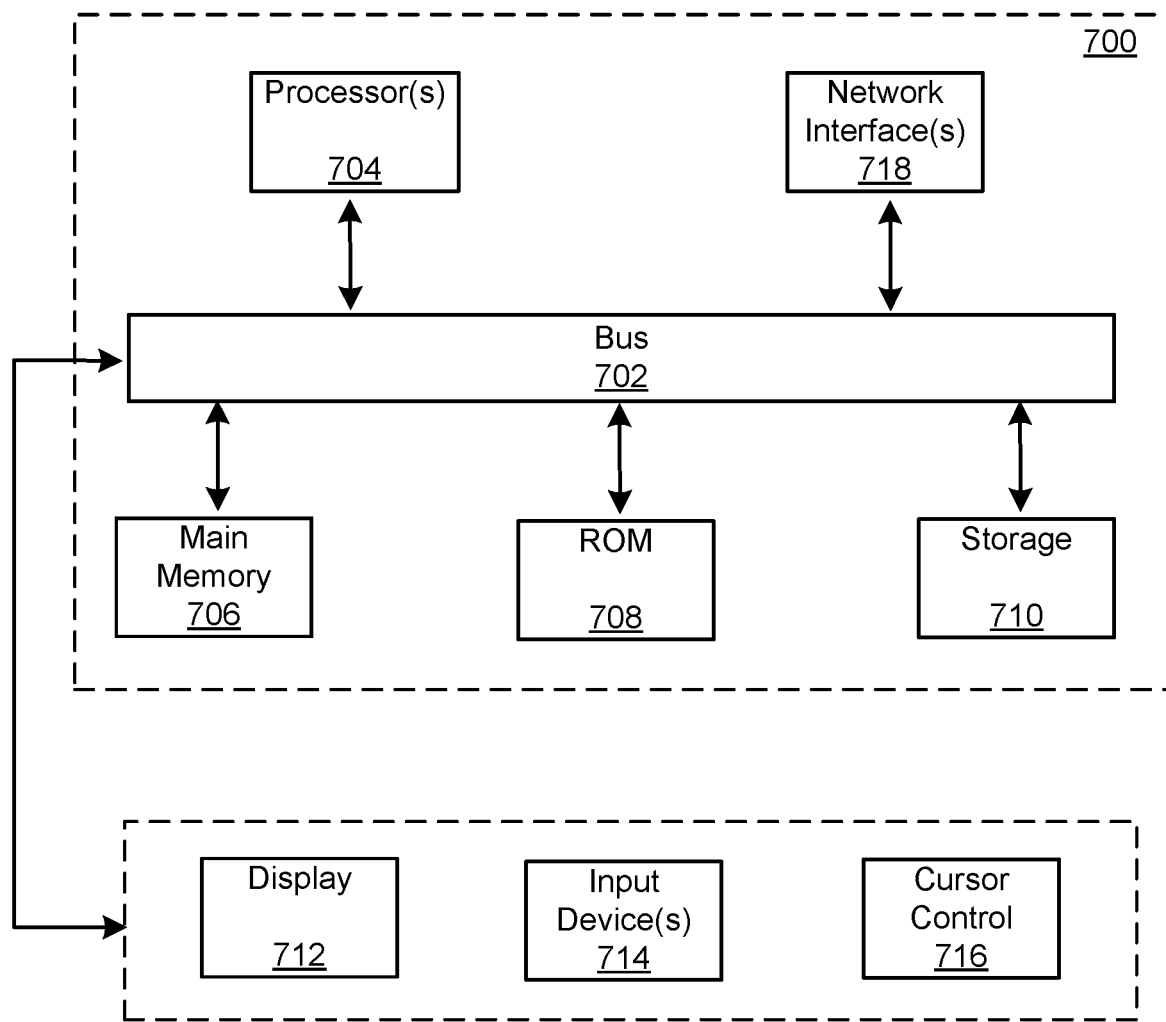
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
receiving, by a computing system, a template usable to generate configuration lines for at least one network device;
interpreting, by the computing system, a preprocess file including a specification to request at least one server-side feature enabling execution of at least one server-side function with which to obtain information for the template, the information being usable to generate the configuration lines and external to the template, wherein:
the at least one server-side feature includes a plurality of subfeatures that granularly define the at least one server-side feature,
the specification includes at least one indication specifying a first subfeature, associated with a particular granularity, to be requested of the plurality of subfeatures, and
the at least one indication specifying the first subfeature comprises at least one of the following: a level of granularity, conditional logic for the at least one indication, or a filter for the at least one indication;
obtaining the information, wherein the obtaining includes executing a request for the at least one server-side feature;
injecting a subset of the obtained information into the template based on a particular granularity in the specification for accessing or filtering results of executing the request for the at least one server-side feature; and
generating the configuration lines based on the template having the subset of the obtained information.

2. The method of claim 1, further comprising:
rendering, by the computing system, the template with the obtained information, wherein the obtained information is injected into the template during the rendering of the template with the obtained information.

3. The method of claim 2, further comprising:
generating, by the computing system, configuration lines executable by the computing system for the at least one network device, wherein the configuration lines are executable by the at least one network device to configure the at least one network device.

4. The method of claim 1, wherein the obtained information includes at least one of an attribute or a capability of the at least one network device.

5. The method of claim 1, wherein a search result is generated by the at least one server-side feature, and the obtained information includes the search result.

6. The method of claim 5, wherein the search result includes existing configuration lines for the at least one network device.

7. The method of claim 1, wherein the executing the preprocess file including the specification comprises:
receiving at least one value associated with an attribute of the at least one server-side feature;
determining that the at least one value satisfies a match criteria specified in the specification for the at least one server-side feature; and
based on the determining that the at least one value satisfies the match criteria, interpreting the preprocess file including the specification that requests the at least one server-side feature.

8. The method of claim 1, wherein the obtained information is accessible by the preprocess file and the template based on a JavaScript Object Notation (JSON) schema.

9. The method of claim 1, wherein the at least one server-side feature is executed by a service at a server.

10. A system comprising:
at least one processor; and
a memory coupled with the at least one processor and storing instructions that, when executed by the at least one processor, configure the at least one processor to:
receive a template usable to generate configuration lines for at least one network device;
interpret a preprocess file including a specification to request at least one server-side feature enabling execution of at least one server-side function with which to obtain information for the template, the information being usable to generate the configuration lines and external to the template, wherein:
the at least one server-side feature includes a plurality of subfeatures that granularly define the at least one server-side feature,
the specification includes at least one indication specifying a first subfeature, associated with a particular granularity, to be requested of the plurality of subfeatures, and
the at least one indication specifying the first subfeature comprises at least one of the following: a level of granularity, conditional logic for the at least one indication, or a filter for the at least one indication;
obtain the information, wherein the obtaining includes executing a request for the at least one server-side feature;
inject a subset of the obtained information into the template based on a particular granularity in the specification for accessing or filtering results of executing the request for the at least one server-side feature; and
generate the configuration lines based on the template having the subset of the obtained information.

11. The system of claim 10, wherein the instructions cause the system to perform the method further comprising:
rendering the template with the obtained information, wherein the obtained information is injected into the template during the rendering of the template with the obtained information.

12. The system of claim 11, wherein the instructions cause the system to perform the method further comprising:
generating configuration lines executable by the computing system for the at least one network device, wherein the configuration lines are executable by the at least one network device to configure the at least one network device.

13. The system of claim 10, wherein the obtained information includes at least one of an attribute or a capability of the at least one network device.

14. The system of claim 10, wherein a search result is generated by the at least one server-side feature, and the obtained information includes the search result.

15. A non-transitory computer-readable storage medium including instructions that, when executed by at least one processor of a computing system, configure the at least one processor to:
receive a template usable to generate configuration lines for at least one network device;
interpret a preprocess file including a specification to request at least one server-side feature enabling execution of at least one server-side function with which to obtain information for the template, the information being usable to generate the configuration lines and external to the template, wherein:

the at least one server-side feature includes a plurality of subfeatures that granularly define the at least one server-side feature, the specification includes at least one indication specifying a first subfeature, associated with a particular granularity, to be requested of the plurality of subfeatures, and the at least one indication specifying the first subfeature comprises at least one of the following: a level of granularity, conditional logic for the at least one indication, or a filter for the at least one indication;

obtain the information, wherein the obtaining includes executing a request for the at least one server-side feature;

inject a subset of the obtained information into the template based on a particular granularity in the specification for accessing or filtering results of executing the request for the at least one server-side feature; and generate the configuration lines based on the template having the subset of the obtained information.

16. The non-transitory computer-readable storage medium of claim 15, wherein the instructions cause the computing system to perform the method further comprising:

rendering the template with the obtained information, wherein the obtained information is injected into the template during the rendering the template with the obtained information.

17. The non-transitory computer-readable storage medium of claim 16, wherein the instructions cause the computing system to perform the method further comprising:

generating configuration lines executable by the computing system for the at least one network device, wherein the configuration lines are-executable by the at least one network device to configure the at least one network device.

18. The non-transitory computer-readable storage medium of claim 15, wherein the obtained information includes at least one of an attribute or a capability of the at least one network device.

19. The non-transitory computer-readable storage medium of claim 15, wherein a search result is generated by the at least one server-side feature, and the obtained information includes the search result.

* * * * *